B. C. STICKNEY.
COMBINED TYPEWRITING AND COMPUTING MACHINE.
APPLICATION FILED MAR. 14, 1918.

1,355,865.

Patented Oct. 19, 1920.
6 SHEETS—SHEET 1.

FIG.1.

WITNESSES:

INVENTOR:
Burnham C Stickney

B. C. STICKNEY.
COMBINED TYPEWRITING AND COMPUTING MACHINE.
APPLICATION FILED MAR. 14, 1918.

1,355,865.

Patented Oct. 19, 1920.
6 SHEETS—SHEET 2.

WITNESSES:

INVENTOR:
Burnham C Stickney

B. C. STICKNEY.
COMBINED TYPEWRITING AND COMPUTING MACHINE.
APPLICATION FILED MAR. 14, 1918.

1,355,865.

Patented Oct. 19, 1920.

WITNESSES:
Arthur G. Johnson
John Waldheim

INVENTOR:
Burnham C Stickney

UNITED STATES PATENT OFFICE.

BURNHAM C. STICKNEY, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,355,865.     Specification of Letters Patent.     Patented Oct. 19, 1920.

Application filed March 14, 1918. Serial No. 222,344.

*To all whom it may concern:*

Be it known that I, BURNHAM C. STICKNEY, a citizen of the United States, residing in Elizabeth, in the county of Union and State of New Jersey, have invented certain new and useful Improvements in Combined Typewriting and Computing Machines, of which the following is a specification.

This invention relates to typewriting machines having computing mechanisms applied thereto, and particularly to machines in which a master wheel is controlled by the numeral keys of the typewriter, and operates the computing wheels, one by one, at the typing operation.

The invention is illustrated in connection with the well-known Underwood addendagraph, in which the key-operated master wheel is mounted upon the stationary framework of the machine, while the computing wheels are mounted upon the typewriter carriage.

In manufacturing machines of this type, it is customary to fit the various parts of the computing mechanism upon the previously completed typewriting machine, and to make certain alterations in the typewriting machine.

In said Underwood addendagraph, it is the practice to form the typewriter carriage with a front vertical plate, and to support said plate by means of ball or roller-bearings upon a track bar which is fixed upon the machine frame, and which comprises upper and lower grooved rails, between which said carriage plate runs, said plate having complementary ball grooves upon its top and bottom edges. For the purpose of securing the necessary leveling of the track and also the necessary accurate fitting throughout the length of the grooved rails which form the track, it is customary to make said track bar in upper and lower parts, each part having one of the grooves, and also to provide for very fine adjustment of the upper and lower rails relatively to each other throughout their length to hold the computing wheels of the totalizers in accurate coöperative relation with the master wheel and carry-over wheels. This adjustment requires a higher degree of skill, and consumes much time, and is otherwise expensive.

It is customary to hold the track upon the machine frame by means of screws, and to mount the master wheel driving train in a separate housing, which is secured upon another portion of the main frame, and also to provide fixed horizontal arms or brackets which extend oppositely beneath the track but not secured thereupon; said arms carrying certain devices to coöperate with the computing mechanism. These and other fixed parts it is necessary to make individually with the greatest accuracy, so that when fitted in place upon various portions of the main frame, they will have exact relationship, so as to bring the master wheel into perfect coöperation with the computing wheels. Even when every care is used in machining and fitting the parts, it is still found necessary to provide for certain final minute adjustments, in order to bring the master wheel and computing wheels into exact coöperation.

This very exact coöperation between the master wheel and each of the computing wheels is found in practice to be difficult and expensive to attain, partly because typewriting machines are not usually manufactured with that extremely high degree of accuracy which is necessary in a key-driven computing mechanism, and partly because the length of the typewriter carriage, in a machine of this class, is usually very great, and the longer the carriage, the more difficult it is to make the different fixtures so accurately that they will fit together in a manner to effect satisfactory coöperation of the master wheel with the computing wheels. The computing wheels are usually assembled in groups, each group having a separate mounting to form a separate totalizer, and each totalizer being usually adjustable to any position along the carriage, so that the range of carriage travel, which must conform to the requirement of accurate fitting, is very great.

The main object of the present invention is the avoidance of the great cost of fitting and adjustment, and to secure reliability of coöperation between the master wheel (and the carry-over mechanism) and the computing wheels.

In carrying out my invention, the housing for the master wheel and its driving-train is mounted directly upon the casting which forms the carriage-track, and is located upon said casting by means of the arbor of the master wheel itself, so that the master wheel is of necessity in exact relationship to the carriage-tracks, and so to the totalizer-bearing carriage-plate which runs upon said track. For this purpose the arbor of the master wheel is extended to form gudgeons, one at each side of the housing, and these gudgeons are fitted in holes that are drilled directly in integral arms that extend forward from the carriage-track to support said housing; additional means being provided for securing the latter upon said casting. Hence, the ball-grooves in the track may first be milled with the required degree of accuracy, and then the casting may be located in a jig by means of the finished groove surfaces, and then the hole for the master-wheel arbor may be drilled by the use of said jig.

The front carriage-plate (and the totalizers mounted thereon) is thus supported in accurate coöperative relation with the master wheel and the carry-over mechanism, which are held in predetermined fixed relation to the computing wheels when first placed on the machine.

It is the practice to provide the machine with guide-bars, whereby the computing wheels may be held against accidental displacement when out of mesh with the master wheel or carry-over wheels. These guide-bars must be held in accurate coöperative relation with the computing wheels of the totalizer in all positions of the totalizer. I secure accuracy of coöperation between said totalizer and said bars by mounting said bars directly upon the novel general casting aforesaid, consisting mainly of the track and the arms which support the master-wheel housing. The guide-bar has heretofore been in the form of a separate casting or bracket extending horizontally from opposite sides of the master-wheel housing, and located below and in front of the carriage-track. These oppositely-extending brackets I form integral with the carriage-track, whereby said general casting is given roughly an L-section, thus imparting thereto great rigidity, which is of great importance, especially in view of the necessity of milling the long track grooves, the milling operation having a tendency to spring the casting.

It is also the practice to provide independent supports for other closely-coöperating portions of the computing mechanism, necessitating the subsequent individual adjustments of said mechanisms, as, for example, the truck-lock or mechanism for holding the totalizers against denominational movement during the actuation of a numeral key. Another example is the mechanism for alining the computing wheels in a carry-over action. Another is the mechanism for detenting the drive gearing of the master wheel, and for moving into coöperative relation therewith a master-actuator rack, such as is usually provided in machines of this type. All of the aforesaid mechanisms require accurate adjustment therebetween and their co-acting mechanisms, which requires a high degree of skill, consumes much time and is otherwise expensive.

The supporting means for these mechanisms coöperating with the totalizers, master wheel and carry-over mechanism, I also mount on said novel general casting, so that the parts are held in a predetermined fixed relation to the other parts.

It will be seen that by forming the supporting-means integrally in the form of said general casting, for all the coöperative mechanisms of the computing machine which heretofore have required fine adjustments, reliability of operation is assured, and the labor and expense of fitting and of making fine adjustments may be minimized, said general casting or supporting-member holding said parts in accurate coöperative relation when first placed on the machine. Said general casting or supporting-member may be easily formed accurately with the aid of jigs and fixtures well known in the machinery producing art.

Other features and advantages will hereinafter appear.

In the accompanying drawings.

Figure 1:
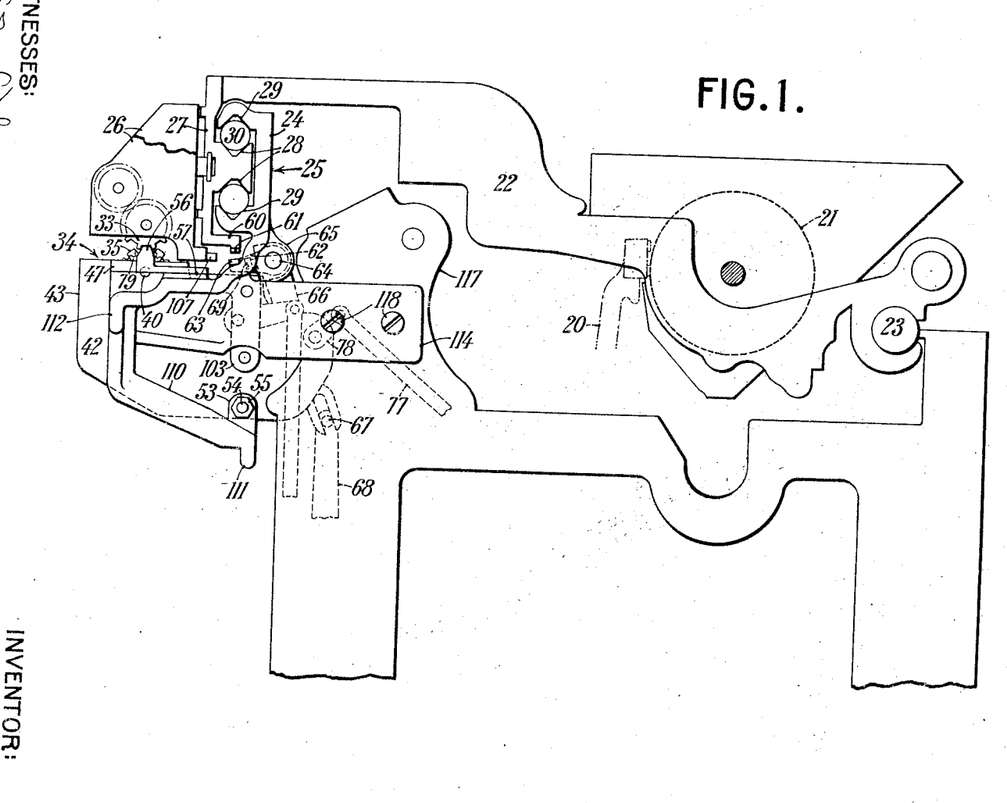
Figure 1 is a side elevation of a portion of an Underwood addendagraph, showing the invention applied thereto.

Numeral keys (not shown) actuate type-bars 20, Fig. 1, to strike against a platen 21 mounted on a typewriter carriage 22 which is slidably mounted on a bar 23 at the rear of the machine and on a track 24 at the front of the machine, integrally formed on a universal supporting member 25. The carriage 22 is provided with the usual escapement mechanism controlled by the keys, and is driven by a spring barrel (not shown).

One or more totalizers 26, Fig. 1, are adjustably mounted at letter-space intervals on a vertical front plate 27, which forms part of the typewriter carriage 22. The plate 27 has V-grooves 28 formed thereon, between which and opposed V-grooves 29 on said track 24, run ball-bearings 30, thus supporting the front of the typewriter carriage 22 and totalizers 26 mounted thereon, said track and its grooves forming a path along which the carriage and totalizers travel.

To rotate the computing wheels 33, Fig. 1, of the totalizers at the actuation of the numeral keys, there is provided driving means in the form of an actuating or master mechanism, indicated in general at 34, including a substantially stationary master wheel 35, and a carry-over mechanism 36, the carry-over wheels 37 of which are mounted adjacent to and concentrically with the master wheel. Said actuating mechanism is usually mounted at the central portion of the machine in front of and below said track 24. The driving wheels of said actuating mechanism are connected to the numeral keys to rotate the computing wheels 33 in accord with the digital value of any numeral key actuated, said rotation being imparted to the wheels 33 of any totalizer 26 when said totalizer is in a computing zone; that is, when its wheels 33 are in juxtaposition with the master wheel 35.

To secure accuracy of coöperation between the totalizer wheels 33 and the master wheel 35 and carry-over wheels 37, the arbor 40, on which said master wheel and carry-over wheels are usually mounted, is provided with extensions 41 which project beyond the side walls 42 of the master-wheel casing 43, and fit into annular bearings 44, provided on the universal supporting member 25. Said annular bearings are so placed, relatively to the path or track along which the typewriter carriage and totalizers travel, that the master wheel and carry-over wheels on the arbor 40, which is located by said bearings 44, will be placed and held in accurate meshing relation with the wheels 33 of the totalizers, and the axis of said wheels 35, 37 parallel with said path.

The annular bearings 44 are formed so that semi-annular portions 45 thereof, Figs. 5, 6, 9 and 10, are formed on the universal supporting member 25, one for each end 41 of the master wheel arbor 40, and complementary semi-annular portions of said bearings are formed in caps 47, which are fastened, as by screws, to the universal supporting member 25, to complete said annular bearings 44, after the master wheel arbor 40 has been inserted into said bearings, and to hold said arbor against displacement.

It will be seen that the actuating mechanism 34 is thus held in a substantially fixed relation with the track 24 and totalizers 26, and in accurate coöperative relation with the computing wheels 33 of the totalizers when said acuating mechanism is once placed on the machine, no fine adjustments being required to hold said actuating mechanism in the manner herein described.

To secure the master wheel 35 and adjacent carry-over wheels 37 against accidental displacement, and to aid in holding said wheels in accurate meshing relation with the computing wheels 33 of the totalizers, the universal supporting member 25, at its central portion, is provided with integral downward extensions 51, Figs. 1 to 10, connected by a brace 52 integral with said supporting member, and on which are integrally formed a pair of brackets 53 placed so as to straddle the rear of the master-wheel casing 43 at the bottom, Figs. 1, 2, 3 and 4, and to receive the ends of a tie-rod 54, arranged to pass through the casing 43 and brackets 53. The ends of said tie-rod 54 are provided with nuts 55 threaded onto said rod at the outside of said brackets to fix said casing accurately in place.

To hold the computing wheels of the totalizers 26 in alinement and against displacement, when out of mesh with the master wheel 35 or carry-over wheels 37, and to guide said computing wheels into mesh with the master wheel and carry-over wheels, there are provided alining bars 56, extending on either side of the master mechanism 34 a distance including the extreme ends of travel of the outermost totalizers, and adapted to engage between the teeth of the computing wheels 33 of the totalizers. To support said alining bars 56 and secure accuracy of coöperation therebetween and the wheels 33 of the totalizers, and to avoid alterations of the alining bars 56 and fine adjustments thereof to fit them to their purpose after being once placed on the machine, there is provided on the universal supporting member 25 locating surfaces 57, Figs. 4 to 8, at each end of said member 25, said surfaces being so placed with relation to the dimensions of the alining bars and totalizers, of the track 24 along which the totalizers travel, and of the bearings 44 for the master-wheel arbor 40, as to hold said bars in accurate meshing relation with the wheels 33 of the totalizers, when said totalizers are beyond said master wheel 35 and carry-over wheels 37, and to hold said bars 56 parallel with the track 24.

The machine is provided with mechanism to aline the wheels 33 of the totalizer laterally in accurate meshing relation with the master wheel 35, and to hold said wheels in mesh, and against lateral displacement, until the completion of a computing action. Said mechanism includes a rearward extension 60 on the front plate 27 of the carriage on which the totalizers are mounted, Fig. 1, said extension having teeth 61 formed thereon at letter-space intervals coöperating with an arm 62 having a wedge 63 formed thereon to engage said teeth 61 during the actuation of any numeral key, thereby holding said front plate 27 and attached parts against lateral displacement in a manner more fully illustrated and described in the application of Henry L. Pitman, No. 818,460, filed July 19, 1917.

It is advantageous to journal the shaft 64 which carries the arm 62 and wedge 63 coöperating with said teeth 61, on the universal supporting member 25, so that a relative adjustment between said arm and said teeth will not be required when assembling the machine.

For this purpose, the universal supporting member 25 is provided with a pair of ears or bearings 65, Figs. 1, 2, 3, 6 and 7 to 10, formed on the back thereof, one of said ears being placed about the middle of said supporting member, and the other ear near the right-hand end thereof; and said shaft 64 is journaled in the bearings formed in said ears in such manner that the parts which are connected to said shaft may lie between said bearings 65. The arms on said shaft include the wedge-bearing arm 62, which co-acts with the teeth 61 on the front carriage-plate 27, and an arm 66 on the right end of said shaft 64, as seen from the rear as in Fig. 2, which has a pin-and-slot connection 67 with an upstanding arm 68, Figs. 1 and 2 connected to hold the shaft and wedge in effective position during the actuation of a numeral key.

Figure 2:
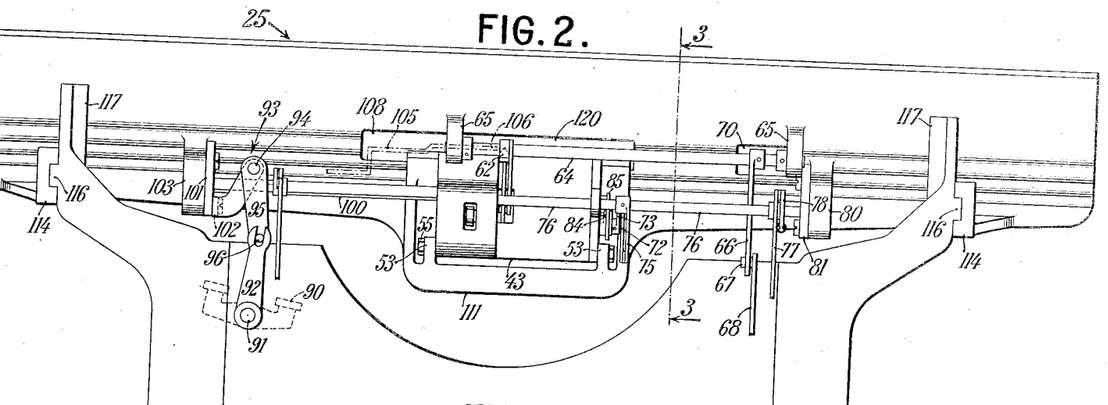
Fig. 2 is a rear view of the general supporting-member, showing some of the parts supported thereby.

Said downwardly-extending arm 66, which is mounted on the right end of the shaft 64, looking from the rear as in Fig. 2, which carries the wedge-bearing arm 62, is usually provided with adjusting mechanism controlled by a screw 69, so that the arm 66 may be adjusted angularly relatively to the wedge-bearing arm 62. To make said adjusting mechanism accessible, the universal supporting member 25 is provided with an aperture 70, Figs. 2, 5, 6 and 8, near the left side of its central portion, so that a tool may be easily passed through said aperture to manipulate the screw 69 of said adjusting mechanism.

To aline the dial wheels and computing wheels of a totalizer 26 when a carry-over operation is taking place, there is provided mechanism (not shown), co-acting with the carry-over wheels 37, said mechanism being mounted in the master-wheel casing 43, as is fully illustrated and described in the application of Henry L. Pitman, No. 81,574, filed March 2, 1916. Said mechanism includes a series of detent levers coöperating with the carry-over wheels 37, controlled by a cam fast on a shaft 72, Fig. 3, journaled in said master-wheel casing.

Figure 3:
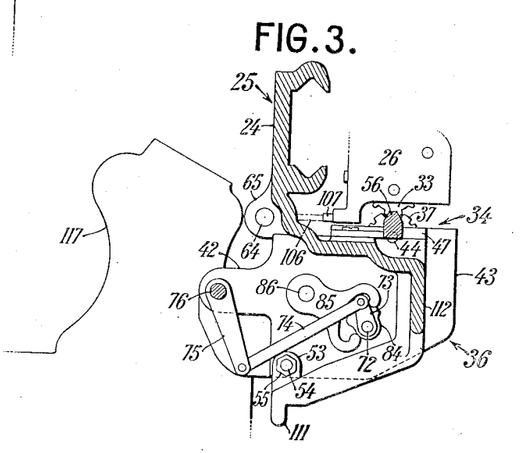
Fig. 3 is a sectional, side view, taken at the line 3—3 of Fig. 2.
Figure 4:
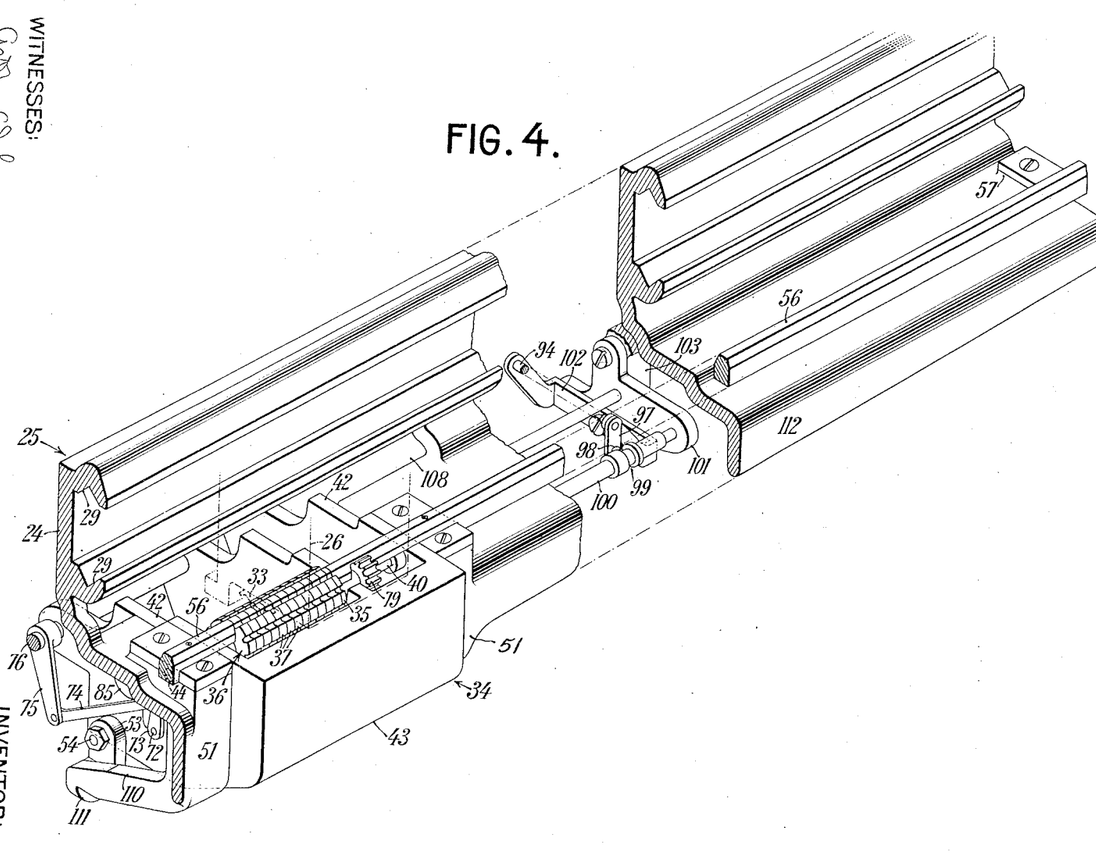
Fig. 4 is a fractional perspective view of the right-hand end and central portion of the general supporting member, showing some of the parts supported thereby, portions being broken away to show the underlying structure.
Figure 5:
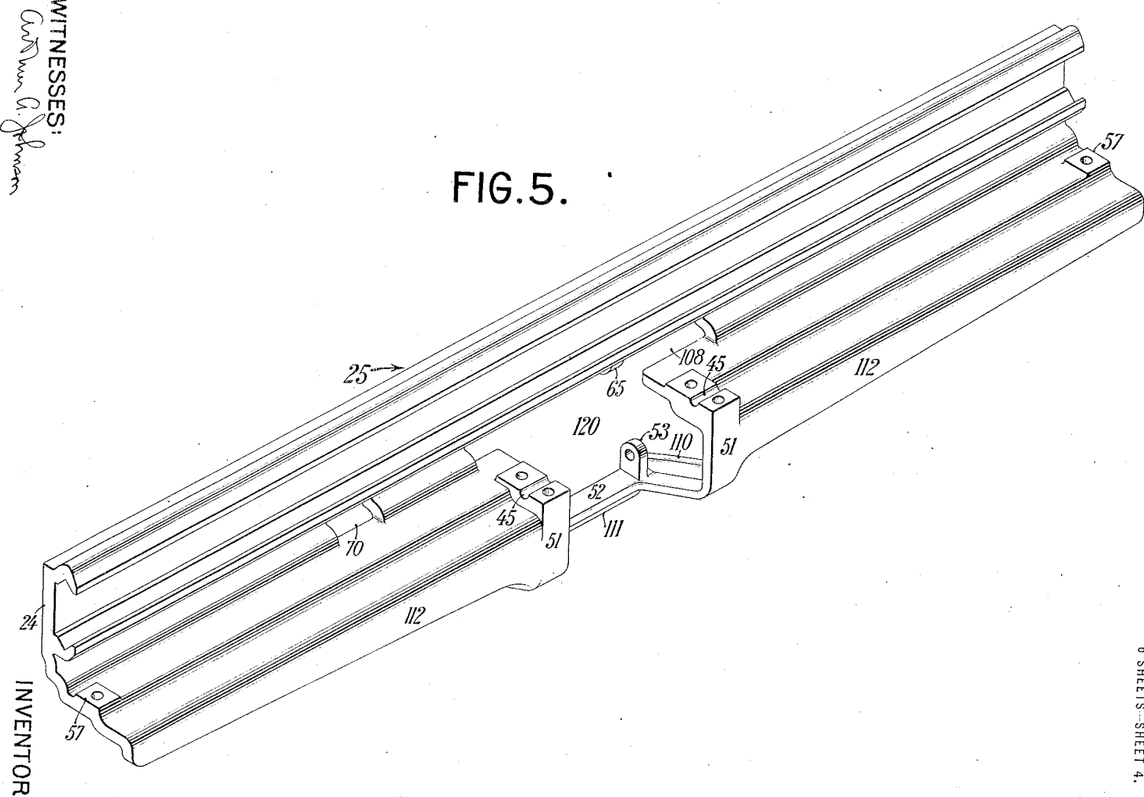
Fig. 5 is a perspective view of the general supporting-member, stripped of all the parts attached thereto and which it supports.
Figure 6:
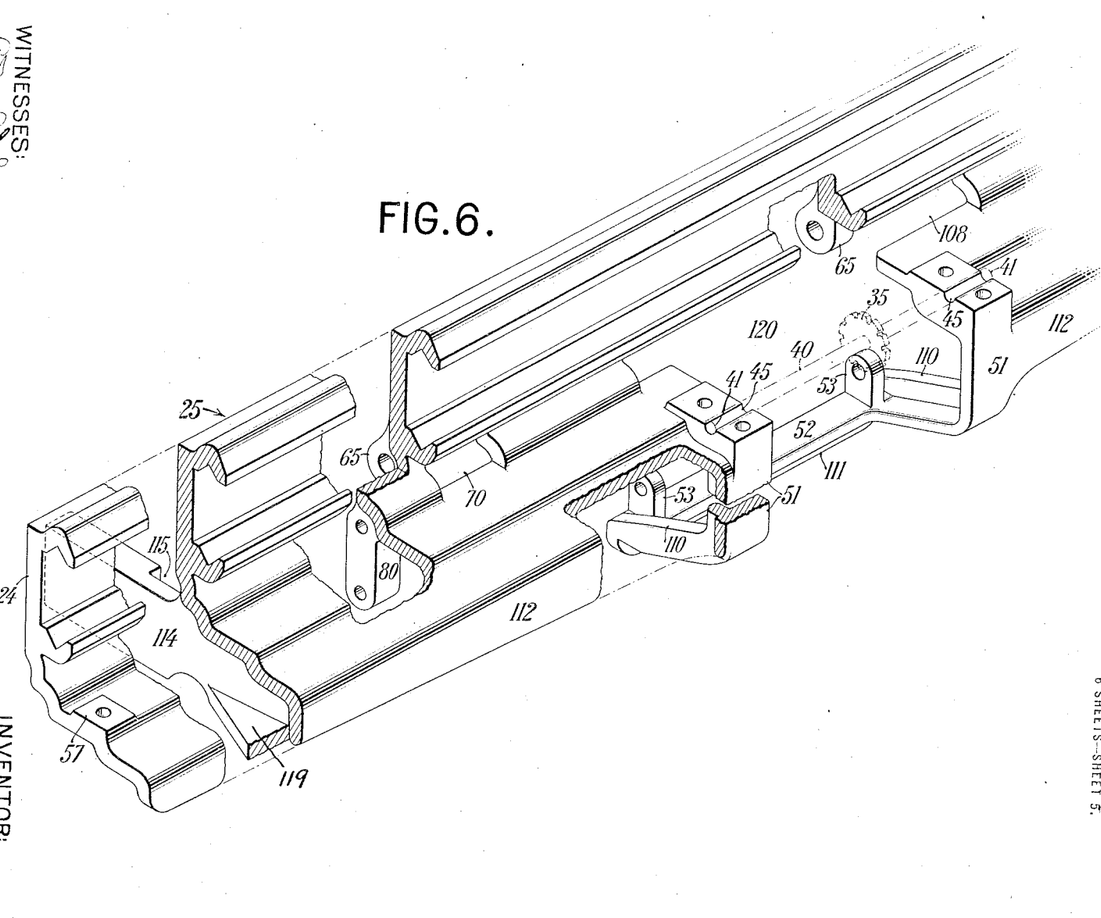
Fig. 6 is a view similar to Fig. 5, showing the left-hand end and central portion of said supporting-member, with parts broken away to show the underlying structure.
Figure 7:
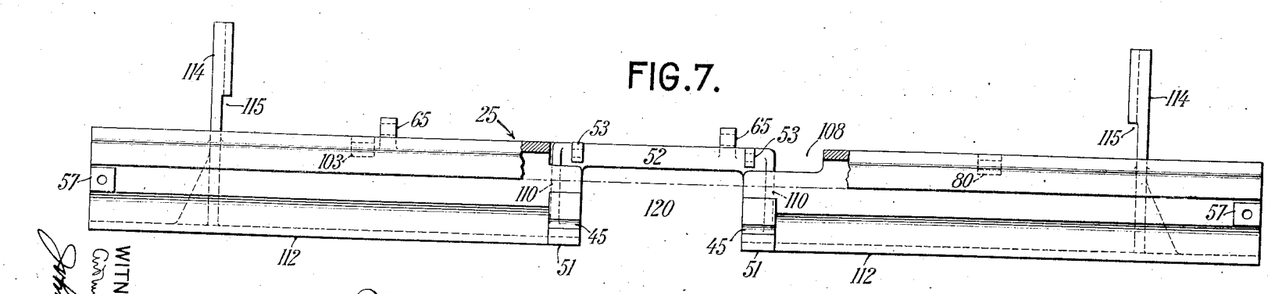
Fig. 7 is a top plan view of the general supporting-member, stripped of all the parts attached thereto.
Figures 8, 9, 10:
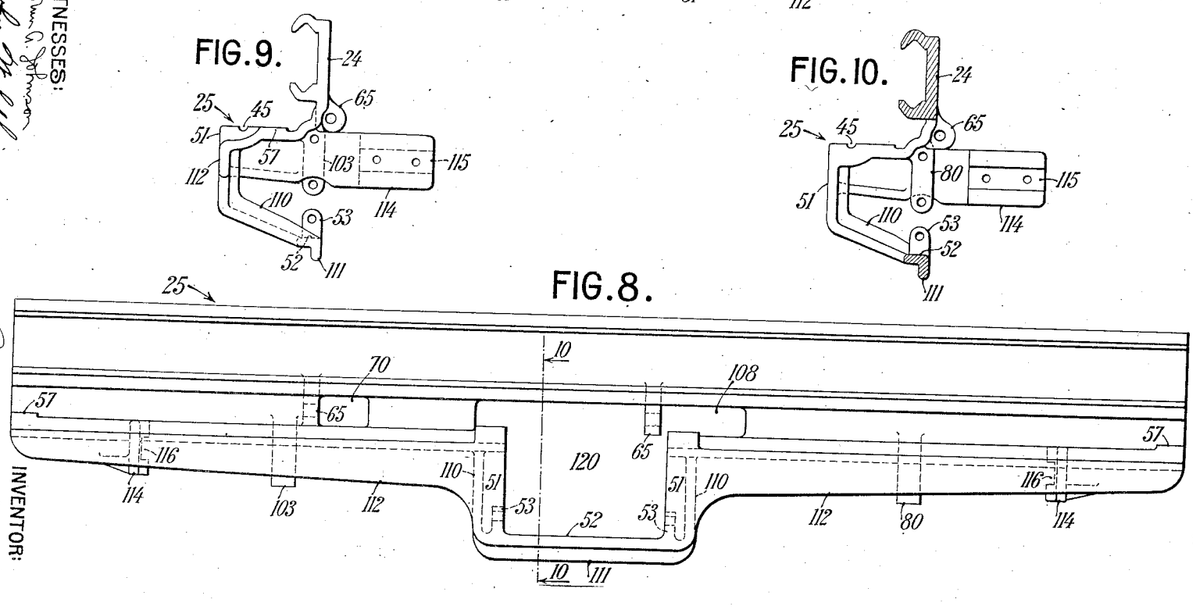
Fig. 8 is a front elevation of the general supporting-member, shown in Fig. 7.
Fig. 9 is a side elevation of the general supporting-member, shown in Figs. 7 and 8, looking from right to left.
Fig. 10 is a sectional, side elevation, taken on the line 10—10 of Fig. 8.

To actuate this carry-over alining mechanism, there is mounted on the shaft 72 thereof an upstanding arm 73, Figs. 3 and 4, connected to one end of a rearwardly-extending link 74, the other end of which is connected to an arm 75 extending downwardly from a shaft 76 which is actuated by an obliquely, rearwardly-extending link 77, Figs. 1 and 2, the forward end of which is fast to another arm 78 on said shaft, and the rearward end of which is connected with the escapement mechanism (not shown), of the typewriter carriage, as illustrated and described in said Pitman application, No. 81,574.

It will be noted that the shaft 76, which is actuated from the escapement mechanism by said obliquely and rearwardly-extending link 77, is also connected to actuate mechanism for alining and detenting the drive gearing arranged between the master wheel 35 and the numeral keys, a portion of said gearing being shown at 79, Figs. 1 and 4. Said shaft 76 is also connected with mechanism for raising and lowering the rear end of a master-rack-bar (not shown), which co-acts with said master-wheel-drive-gearing to rotate said gearing and master wheel amounts in accord with the digital value of the actuated numeral keys, as in said Pitman application, No. 81,574.

It is advantageous to mount a portion of this mechanism on the universal supporting member 25, so as to minimize the labor of accurately adjusting the parts. For this purpose, the universal supporting member is provided with a downwardly-extending bracket 80, Figs. 2, 6 and 10, near its left end, and integrally formed therewith, on which may be mounted another bracket 81, Fig. 2, which serves to support the left end of the shaft 76 which is directly actuated by said obliquely, rearwardly-extending link 77, the right-hand end of said shaft 72 being journaled in the casing 43 of the master-wheel mechanism 34.

It will be noted that said shaft 76 will be in accurate coöperative relation with the co-acting parts of the computing mechanism without any fine adjustments being required when once placed on the machine, since the members which support both ends of said shaft are located by the integral member or universal support 25.

The mechanism for raising and lowering the forward end of said master-rack-bar, which actuates the drive-gearing 79 for the master wheel 35, is connected so as to be actuated simultaneously with the carry-over alining mechanism.

For this purpose, the shaft 72 of the carry-over alining mechanism, which is journaled in the walls of the master-wheel casing 43, is provided with a cam 84, Fig. 3, without said casing, coöperating with a forked member 85 fast on the left end of another shaft 86, also journaled in the walls of said casing 43. Said rack-raising-and-lowering-mechanism for the forward end of said rack-bar is connected with said other shaft 86, in a manner fully illustrated and described in said Pitman application, No. 81,574.

It will be seen from the foregoing that the entire mechanisms for raising and lowering said master-rack-bar are accurately placed on the machine without the aid of fine adjustments, all the parts being located by means of said universal supporting member 25, since the master-wheel casing 43, on which portions of said mechanisms are mounted, is supported and accurately located by said universal supporting member; and the portions of said mechanisms without said casing are also supported and accurately located by said universal supporting member.

To set the machine to adding, subtracting or neutral state, keys 90, Fig. 2, are provided fast on a rock-shaft 91 journaled in the framework and having an upstanding arm 92 thereon adapted to actuate a shifter, indicated in general at 93, Figs. 2 and 4. Said shifter includes a short rock-shaft 94 having a downwardly-extending arm 95, Fig. 2, at the rear end thereof, the lower end of which has a pin-and-slot connection 96 with the upwardly-extending arm 92 mounted on the rock-shaft 91 on which said state-controlling keys 90 are mounted. The forward end of said short rock-shaft 94 also has a downwardly-extending arm 97 thereon, Fig. 4, having a pin 98 at its lower end engaging an annular groove 99 in a horizontally-extending shift-bar 100, the left-hand end of which is journaled in the master-wheel casing 43, and carries a portion of said master-wheel drive-gearing. The right-hand end of said shift-bar is preferably journaled in a bracket 101, Figs. 2 and 4, which also supports an auxiliary bracket 102 in which is journaled the rock-shaft 94 of the shifter 93.

It is advantageous to support said shifter and said shift-bar on the universal supporting member 25, so that the parts of the state-setting mechanism will be located in relative accurate coöperative relation by said supporting member when first placed on the machine. For this purpose, said universal supporting member 25 has a downwardly-extending bracket 103, Figs. 1, 2, 4, 8 and 9, near its right end and integrally formed therewith, on which the bracket 101 and auxiliary bracket 102 for supporting the main portion of the state-setting mechanism are mounted.

It will be seen that the entire state-setting mechanism is thus located by said universal supporting member 25 relatively to the other parts of the computing mechanism, since said master-wheel casing 43 and said brackets 101, 102, on which the state-shifting mechanism is mounted, are mounted on, and located by, said universal supporting member 25.

That the typewriter carriage, in a letter-feeding operation, may automatically skip the punctuation spaces usually provided between the groups of dial wheels on the totalizers 26, the computing machine, herein disclosed, is provided with a punctuation-space-skipping device, such as is illustrated and described in the application of Henry L. Pitman, No. 176,676, filed June 25, 1917.

A horizontally-disposed lever 105, Figs. 2 and 3, more fully illustrated in said Pitman application, No. 176.676, is pivoted on a bracket fast to the right side of the master-wheel casing 43, and is so placed that its free end 106 is in coöperative relation with cams 107 formed on the rear of the totalizers 26, and adapted to be actuated by said cams as the totalizers travel in denominational direction in a computing zone. The cams 107 on the rear of the totalizers are placed in accord with punctuation spaces between the groups of dial wheels and computing wheels 33 of the totalizers, so as to actuate said lever 105 when a punctuation space between said computing wheels passes over the master wheel 35, said lever being connected with the escapement mechanism of the typewriter which is arranged to permit the typewriter carriage 22 to move a plurality of letter-spaces at the actuation of said lever by the totalizer cams.

The arrangement is such that after a computation has taken place on a computing wheel 33 of a higher denomination adjacent to a punctuation space, the typewriter carriage will move in letter-feeding direction a distance to bring the computing wheel 33 of next lower denomination into mesh with the master wheel 35 at a single stroke of the last actuated numeral key.

To permit co-action between the cams 107 on the totalizers and said punctuation-skipping-lever 105, 106, the universal supporting member 25 is provided with an aperture 108, Figs. 2, 4, 5, 6 and 10, at the right of its central portion, through which the free end 106 of said lever projects into the path of the cams 107 of the totalizers.

To insure all the mechanisms attached to the universal supporting member 25 against displacement, the universal supporting member is rigidly constructed so as not to be subject to springing or bending when the parts are placed thereon, when the computing mechanism is actuated, or in the course of construction of said universal supporting member.

For this purpose, the material, preferably metal, of which the universal supporting member 25 is made, is evenly distributed so as to avoid any internal strains or warping when the metal is cast.

To avoid bending, when forming said universal member, or in the use thereof, said member is provided with bracing ribs 110, Figs. 1 to 10, placed at the downward extensions 51 at its central portion, which are connected by a rib 111 across the brace 52, on which are formed the brackets 53, by which the master-wheel casing 43 is fastened against displacement, and therewith all the computing mechanism attached thereto. Said universal member is further strengthened by ribs 112 extending laterally on each side of its central portion, said ribs being in the form of an apron arranged to cover the mechanism extending on each side of the master-wheel casing 43, so as to shield said mechanism against injury and to add to the good appearance of the machine.

There are also provided integrally with said universal member 25, rearward extensions or brackets 114, whereby said member 25 is secured to the framework of the typewriter. For this purpose, said extensions 114 are provided with opposed grooves 115, Figs. 2 and 7 to 10, facing inwardly, which fit over opposed tongues 116, Fig. 2, facing outwardly, formed on the brackets 117 of the typewriter framework, said extensions 114 being slidably mounted on said typewriter brackets 117, so as to afford a bodily forward and rearward adjustment of said universal member 25, which may be rigidly secured by means of screws 118 to the typewriter framework.

It will be noted that the rearward extensions 114 of the universal supporting member 25 are braced by ribs 119, Figs. 2, 6, 7 and 10, and that an aperture 120, Figs. 4, 5, 6 and 8, formed at the central portion of said member 25, into which the master-wheel casing 43 is inserted, is entirely inclosed in the following manner: by the track 24 at the top; by the apron 112, the downward extensions 51 and the ribs 110 on the sides; and by the brace 52 and the rib 111 at the bottom; thus strengthening said supporting member at the aperture 120. It will be seen that the universal supporting member 25 is so proportioned and arranged as to minimize liability of breakage in handling and in forming.

Variations may be resorted to within the scope of the invention, and portions of the improvements may be used without others.

Having thus described my invention, I claim:

1. In a computing machine, the combination of a traveling totalizer, a track forming a path along which said totalizer travels and on which it is supported, a master wheel coöperating with said totalizer, and means for supporting said master wheel in substantially fixed relation with the path of travel of the totalizer, said master wheel support being integrally formed with said totalizer support.

2. In a computing machine, the combination of a traveling totalizer, a support along which said totalizer travels, a master wheel coöperating with said totalizer, and means for locating said master wheel relatively to said totalizer, said master wheel locating means being integrally formed with said support.

3. In a computing machine, the combination with a totalizer and a supporting member along which it travels, of a frame, a master mechanism mounted in said frame, including a master wheel and a master-wheel arbor extending beyond said frame, bearings for said arbor, integral with said supporting member, to support said frame, and means integral with said supporting member whereby said frame may be fixed in position on said supporting member.

4. In a computing machine, the combination of a traveling totalizer, a substantially stationary master wheel coöperating with said totalizer, a substantially stationary carry-over mechanism coöperating with said totalizer, tracks forming a path along which said totalizer travels, and means for supporting the master wheel and carry-over mechanism in fixed relation with the path of the totalizer, said master-wheel and carry-over-mechanism support being integrally formed with the tracks.

5. In a computing machine, the combination of a traveling totalizer, a track forming a path for said totalizer, a master wheel coöperating with said totalizer, an arbor on which said master wheel is mounted, carry-over mechanism mounted on said arbor, and bearings for supporting said arbor, said track and bearings being integrally formed.

6. A computing attachment for a typewriter, comprising a traveling totalizer, totalizer-actuating means, and an integral support adapted to be attached to the frame of the typewriter, comprising a track for said totalizer and means to support said actuating means in fixed relation with respect to said track.

7. In a computing machine, the combination of a traveling totalizer, a track along which said totalizer travels, means for driving said totalizer, an arbor on which a portion of said driving means is mounted, and bearings for said arbor integral with said track for holding the arbor parallel with said track.

8. In a computing machine, the combination of a traveling totalizer, a track along which said totalizer travels, a master wheel, adjacent concentrically-mounted carry-over wheels, and a support integral with said track for holding said master wheel and carry-over wheels parallel with said track.

9. In a computing machine, the combination of a traveling totalizer including dial wheels and computing wheels, a track along which said totalizer travels, a master wheel, adjacent concentrically-mounted carry-over wheels, and a support integral with said track for holding said master wheel and carry-over wheels parallel and in meshing relation with said computing wheels.

10. In a computing machine, the combination of a traveling totalizer, a track along which said totalizer travels, means for driving said totalizer, an arbor on which a portion of said driving means is mounted, bearings for said arbor integral with said track for holding said arbor parallel with said track, and means for holding said arbor in place.

11. In a computing machine, the combination of traveling totalizers, a track along which said totalizers travel, said track being integrally formed on a universal supporting member, a master mechanism including a master wheel coöperating with said totalizers, a casing in which said master mechanism is mounted, an arbor on which said master wheel is mounted having extensions beyond said casing, bearings for said arbor integral with said supporting member for supporting said master wheel and casing, and means integral with said supporting member for fixing said casing.

12. In a computing machine, the combination of a traveling computing element, a track along which said traveling computing element travels, a substantially stationary computing element coöperating with said traveling element, and means for supporting said stationary computing element in accurate coöperative relation with said traveling element, said supporting-means being integral with said track.

13. In a combined typewriting and computing machine, the combination with a traveling carriage, of a plate on said carriage, a track mounted on the framework of the machine along which said plate travels the bearings running between said plate and said track, a totalizer adjustable along said plate, master mechanism for actuating said totalizer, and a support for said master mechanism, said support being integral with said track.

14. In a computing machine, the combination of a traveling totalizer, a track along which said totalizer travels, means for driving said totalizer, a cylindrical arbor on which a portion of said driving means is mounted, semi-cylindrical bearings for said arbor integral with said track for holding said arbor parallel with said track, and caps on said bearings having semi-cylindrical grooves complementary to said bearings for holding said arbor in place.

15. In a computing machine, the combination with a traveling totalizer, of a master mechanism for actuating said totalizer an integrally-formed universal supporting-member for supporting said totalizer and master mechanism, bars for holding the wheels of the totalizer against displacement when out of mesh with the wheels of the master mechanism, and a support for said bars, said support being integral with said universal supporting-member.

16. In a computing machine, the combination of a traveling totalizer, a track along which said totalizer travels, actuating mechanism coöperating with said totalizer, supporting-means integral with said track for said actuating mechanism, bars for holding the wheels of said totalizer against displacement when out of mesh with the actuating mechanism, and means for supporting said bars, said supporting-means being integrally formed with said track and arranged to hold said bars parallel with said track when once placed on the support.

17. In a combined typewriting and computing machine, the combination with a traveling carriage, of a plate on said carriage, a track along which said plate and carriage travel, a totalizer adjustably mounted on said plate traveling therewith, actuating mechanism coöperating with said totalizer, mechanism for holding the totalizer against denominational displacement during the operation of the actuating mechanism, and means for supporting said holding mechanism, said supporting means being integrally formed with said track.

18. In a computing machine, the combination of a traveling totalizer, a universal supporting-member on which the totalizer is supported and along which said totalizer travels, a master wheel and carry-over mechanism coöperating with said totalizer, means for alining the wheels of the totalizer and carry-over mechanism in a carry-over operation, and means for supporting said alining means in accurate coöperative relation with the carry-over mechanism, said supporting-means being integrally formed with said universal supporting-member.

19. In a computing machine, the combination with a totalizer, of actuating mechanism coöperating with said totalizer, a common integral support for said totalizer and said actuating mechanism, means for setting the machine to an adding, subtracting or neutral state, and means for supporting said state-setting means, said supporting means being fixed on said common support.

20. In a computing machine, the combination with a totalizer, of a master wheel and a train of gearing therefor coöperating with said totalizer, an integral universal supporting member for supporting said totalizer and master wheel in accurate coöperative relation, means for driving said master-wheel gearing, and means for supporting said driving means, said supporting means being integrally formed with said universal supporting member for holding said driving means in accurate coöperative relation with the master-wheel gearing.

21. In a computing machine, the combination of a totalizer, a master wheel and a train of driving gears therefor coöperating with said totalizer, and a universal supporting member supporting said totalizer and master wheel in accurate coöperative relation, and provided with means, integral therewith, for supporting mechanism for detenting and alining said master-wheel gearing.

22. In a combined typewriting and computing machine, the combination with a traveling carriage, of a totalizer mounted on said carriage having computing wheels arranged in groups and punctuation spaces between said groups, a master wheel coöperating with said computing wheels, and a universal supporting member along the front of which said totalizer travels, formed with an aperture to enable said totalizer to control a mechanism arranged at the rear of said universal supporting member for causing said carriage to move a plurality of letter-spaces when a space between said groups of computing wheels is at the master wheel.

23. In a computing machine, the combination of a traveling computing element, a track along which said traveling element travels, a substantially stationary computing element coöperating with said traveling element, and a single means for supporting said computing elements and holding one of said computing elements in substantially fixed and accurate coöperative relation with the other, said supporting-means being integral with said track.

24. In a computing machine, the combination of a traveling totalizer, a track along which said totalizer travels, means for driving said totalizer, an arbor on which a portion of said driving means is mounted, bearings for said arbor integral with said track for holding said arbor parallel with said track, and caps on said bearings for holding said arbor in place.

25. In a combined typewriting and computing machine, the combination with a traveling carriage, of a plate including rails on said carriage, a track including rails on the frame-work of the machine along which said plate travels, ball-bearings running between the rails of said plate and the rails of said track, a totalizer adjustable along said plate, master mechanism for actuating said totalizer, and a support for said master mechanism, said support being integral with said track and holding said master mechanism in accurate coöperative relation with said totalizer.

26. In a computing machine, the combination with a traveling totalizer, of a master mechanism for actuating said totalizer, an integrally-formed universal supporting-member for supporting said totalizer and master mechanism, bars for holding the wheels of the totalizer against displacement when out of mesh with the wheels of the master mechanism, and a support for said bars, said support being integral with said universal supporting-member and arranged to hold said bars in accurate coöperative relation with said totalizer when the bars are once placed on said supporting-member.

27. In a combined typewriting and computing machine, the combination with a traveling carriage, of a plate on said carriage, a track on a universal supporting-member along which said plate and carriage travel, a totalizer adjustably mounted on said plate traveling therewith, actuating mechanism on said universal supporting-member coöperating with said totalizer, mechanism coöperating with said plate for holding the totalizer against denominational displacement during the operation of the actuating mechanism, and means for supporting said holding mechanism, said supporting-means being integrally formed with said universal supporting-member and arranged to support said holding mechanism in accurate coöperative relation with said plate when once placed on said universal supporting-member.

28. An attachment for a typewriter, comprising, in combination, a traveling totalizer, a support, adapted to be attached to the frame of the typewriter, along which said totalizer passes, a master wheel to coöperate with said totalizer, and means, integrally formed with said support, to support said master wheel in suitable position with reference to the path of said totalizer.

29. In a computing machine, the combination with a totalizer, of actuating mechanism coöperating with said totalizer, a common integral support for said totalizer and said actuating mechanism, mechanism for setting the machine to an adding, subtracting or neutral state, and a bracket integral with said common support for supporting said state-setting mechanism in accurate cooperative relation with the actuating mechanism.

30. In a computing machine, the combination with a totalizer, of a master wheel and a train of driving gears therefor coöperating with said totalizer, a universal supporting-member supporting said totalizer, a casing in which said master wheel and gearing are mounted, means integral with said universal supporting member for supporting said casing, master wheel and gearing in accurate coöperative relation with the totalizer, and a bracket integrally formed with said universal supporting member for supporting detenting and alining mechanism for said master-wheel gearing in accurate coöperative relation with the master-wheel gearing.

31. In a computing machine, the combination of a traveling totalizer, a track along which said totalizer travels, a substantially stationary master wheel mounted in a casing coöperating with said totalizer, an arbor having extensions without said casing on which said master wheel is mounted, bearings for said arbor extensions integral with said track for holding said arbor parallel with said track, and caps on said bearings fitting on said extensions for holding said arbor against displacement.

32. In a computing machine, the combination with a totalizer, of actuating mechanism partly mounted within a casing and partly without said casing coöperating with said totalizer, an integral member for supporting said totalizer and actuating mechanism, and an apron for shielding the actuating mechanism without the casing, said apron being integrally formed with said member.

33. In a combined typewriting and computing machine, the combination of a traveling carriage, a totalizer on said carriage, actuating mechanism coöperating with said totalizer, and a single integral member for supporting said carriage, totalizer and actuating mechanism.

34. In a combined typewriting and computing machine, the combination of a traveling carriage, a totalizer on said carriage, actuating mechanism coöperating with said totalizer, detenting mechanism coöperating with said carriage, and a single integral member for supporting said carriage, totalizer, actuating mechanism and detenting mechanism.

35. In a combined typewriting and computing machine, the combination with a traveling carriage, of a plate on said carriage, a totalizer adjustably mounted on said plate, actuating mechanism coöperating with said totalizer, detenting mechanism coöperating with said plate, and a single integral member for supporting said plate and totalizer, actuating mechanism, and detenting mechanism.

36. An attachment for a typewriting machine, comprising, in combination, a totalizer, a totalizer-actuating master wheel, an arbor, on which said master wheel is mounted, carry-over mechanism on said arbor, and an integral support, adapted to be attached to the frame of the machine, comprising a track for said totalizer and bearings for supporting said arbor.

37. An attachment for a typewriting machine, comprising, in combination, a traveling totalizer, a master wheel, carry-over wheels, coaxial with said master wheel, and an integral bracket, adapted to be attached to the frame of the machine, comprising a totalizer track and a support for holding said master wheel and carry-over wheels in proper position relative to said track.

BURNHAM C. STICKNEY.

Witnesses:
CATHERINE A. NEWELL,
EDITH B. LIBBEY.